US010189010B2

(12) United States Patent
Ifrah et al.

(10) Patent No.: US 10,189,010 B2
(45) Date of Patent: Jan. 29, 2019

(54) COMPOSITION BASED ON ZIRCONIUM OXIDE AND ON AT LEAST ONE OXIDE OF A RARE EARTH OTHER THAN CERIUM, HAVING A SPECIFIC POROSITY, PROCESSES FOR PREPARING SAME AND USE THEREOF IN CATALYSIS

(75) Inventors: Simon Ifrah, La Jarrie (FR); Olivier Larcher, Perigny (FR)

(73) Assignee: Rhodia Operations, Paris (FR)

( * ) Notice: Subject to any disclaimer, the term of this patent is extended or adjusted under 35 U.S.C. 154(b) by 0 days.

(21) Appl. No.: 13/990,787

(22) PCT Filed: Nov. 21, 2011

(86) PCT No.: PCT/EP2011/070569
§ 371 (c)(1),
(2), (4) Date: Jun. 19, 2013

(87) PCT Pub. No.: WO2012/072439
PCT Pub. Date: Jun. 7, 2012

(65) Prior Publication Data
US 2014/0072492 A1   Mar. 13, 2014

(30) Foreign Application Priority Data
Nov. 30, 2010   (FR) .................................... 10 04653

(51) Int. Cl.
*B01J 23/20*   (2006.01)
*B01J 23/00*   (2006.01)
(Continued)

(52) U.S. Cl.
CPC ............ *B01J 23/20* (2013.01); *B01D 53/945* (2013.01); *B01J 21/066* (2013.01); *B01J 23/002* (2013.01);
(Continued)

(58) Field of Classification Search
CPC ........ C01G 25/006; C01G 25/02; B01J 23/20; B01J 21/066; B01J 23/002; B01J 23/10;
(Continued)

(56) References Cited

U.S. PATENT DOCUMENTS

| 2006/0018822 A1* | 1/2006 | Okamoto ...................... 423/608 |
| 2011/0033352 A1 | 2/2011 | Larcher et al. |
| 2012/0264588 A1* | 10/2012 | Kolb et al. ..................... 501/134 |

FOREIGN PATENT DOCUMENTS

| EP | 1 621 251 A1 | 2/2006 |
| FR | 2 926 075 A1 | 7/2009 |
| WO | 98/45212 A1 | 10/1998 |

OTHER PUBLICATIONS

A. Pissenberger, Preparation and properties of niobia- and tantala-doped orthorhombic zirconia, 1995, Journal of Materials Science Letters, 14, 1580-1582.*

(Continued)

*Primary Examiner* — James A Fiorito

(57) ABSTRACT

A composition of zirconium oxide and at least one oxide of a rare earth other than cerium is described. The zirconium oxide has a weight proportion of at least 50% and, after calcination at a temperature of 900° C. for 4 hours, the composition exhibits two populations of pores of which their respective diameters are centered. The diameter of the first pore has a value of from 20 nm to 40 nm and in the second pore has a value of from 80 nm to 200 nm. Further described is how the composition can be used for treating the exhaust gases of internal combustion engines.

18 Claims, 1 Drawing Sheet

(51) Int. Cl.

| | |
|---|---|
| *B01J 23/10* | (2006.01) |
| *B01J 35/10* | (2006.01) |
| *C01G 25/02* | (2006.01) |
| *B01J 37/03* | (2006.01) |
| *B01J 21/06* | (2006.01) |
| *B01J 23/46* | (2006.01) |
| *B01D 53/94* | (2006.01) |
| *B01J 23/02* | (2006.01) |

(52) U.S. Cl.
CPC ............ *B01J 23/10* (2013.01); *B01J 23/464* (2013.01); *B01J 35/109* (2013.01); *B01J 35/1009* (2013.01); *B01J 35/1014* (2013.01); *B01J 35/1047* (2013.01); *B01J 35/1061* (2013.01); *B01J 35/1066* (2013.01); *B01J 37/031* (2013.01); *C01G 25/02* (2013.01); *B01D 2255/1025* (2013.01); *B01D 2255/2061* (2013.01); *B01D 2255/2063* (2013.01); *B01D 2255/2068* (2013.01); *B01D 2255/20715* (2013.01); *B01D 2255/40* (2013.01); *B01D 2255/92* (2013.01); *B01D 2255/9202* (2013.01); *B01J 23/02* (2013.01); *C01P 2006/14* (2013.01); *C01P 2006/16* (2013.01); *C01P 2006/17* (2013.01); *Y02T 10/22* (2013.01)

(58) Field of Classification Search
CPC .. B01J 23/464; B01J 35/1009; B01J 35/1014; B01J 35/1047; B01J 35/1061; B01J 35/1066; B01J 35/109; B01J 37/031; B01D 53/945
USPC .............................. 423/594.12; 502/302, 303
See application file for complete search history.

(56) References Cited

OTHER PUBLICATIONS

Mercera et al., Influence of additives on the thermal stability of the porous texture of monoclinic zirconia, 1991, Applied Catalysis, 71, 363-391.*
International Search Report dated Dec. 27, 2011, by the European Patent Office as the International Searching Authority in International Patent Application No. PCT/EP2011/070569.

* cited by examiner

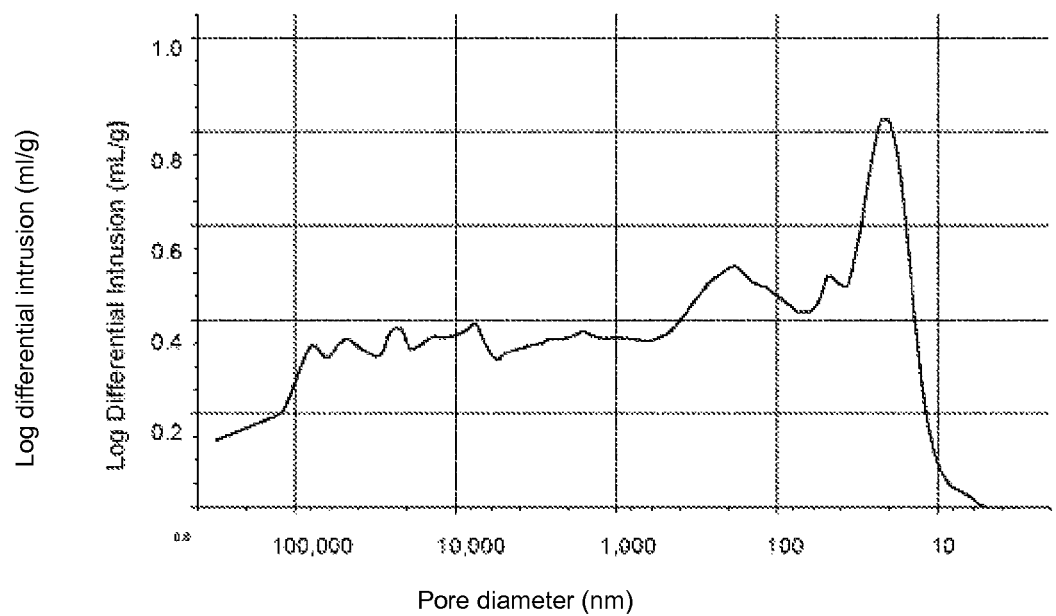

US 10,189,010 B2

COMPOSITION BASED ON ZIRCONIUM OXIDE AND ON AT LEAST ONE OXIDE OF A RARE EARTH OTHER THAN CERIUM, HAVING A SPECIFIC POROSITY, PROCESSES FOR PREPARING SAME AND USE THEREOF IN CATALYSIS

CROSS-REFERENCE TO PRIOR APPLICATIONS

This application is a National Stage of PCT/EP2011/070569, filed Nov. 21, 2011, and designating the United States (published in French on Jun. 7, 2012, as WO 2012/072439 A1), which claims priority under 35 U.S.C. § 119 to FR 10/04653, filed Nov. 30, 2010, each hereby expressly incorporated by reference in its entirety and each assigned to the assignee hereof.

The present invention relates to a composition based on zirconium oxide and on at least one oxide of a rare earth other than cerium, which has a specific porosity, to the processes for preparing same and to the use thereof in catalysis.

"Multifunctional" catalysts are currently used for treating exhaust gases from internal combustion engines (motor vehicle post-combustion catalysis). The term "multifunctional" is understood to mean catalysts capable of carrying out not only oxidation, in particular of carbon monoxide and of hydrocarbons present in the exhaust gases, but also reduction, in particular of nitrogen oxides also present in these gases ("three-way" catalysts). The compositions based on oxides of zirconium and of rare earths today appear to be advantageous elements that can be incorporated into the composition of catalysts of this type.

The products of this type must have a porosity suitable for their use. Thus, they must have a sufficiently high pore volume and thus comprise pores of sufficiently large size to allow good diffusion of the gases.

However, these same products must also have pores which are small in size, since it is these pores which contribute to giving the products a specific surface area that is sufficiently high for them to be usable in catalysis.

It is therefore advantageous to find a good balance between a large surface area, provided by the small pores, and a better gas diffusion provided by the large pores.

The object of the invention is to propose a product which has a high pore volume and both large pores and small pores.

With this aim, the composition of the invention is based on zirconium oxide and on oxides of at least two rare earths other than cerium, in a weight proportion of zirconium oxide of at least 50%, and it is characterized in that it exhibits, after calcination at a temperature of 900° C. for 4 hours, two populations of pores of which the respective diameters are centered, for the first population, about a value of between 20 and 40 nm and, for the second population, about a value of between 80 nm and 200 nm.

Other features, details and advantages of the invention will emerge even more completely on reading the description which follows, with reference to the appended drawing in which:

FIG. 1 is a curve giving the pore distribution of a product according to the invention.

For the rest of the description, the expression "specific surface area" is understood to mean the B.E.T. specific surface area determined by nitrogen adsorption in accordance with standard ASTM D 3663-78 established from the Brunauer-Emmett-Teller method described in the periodical "The Journal of the American Chemical Society, 60, 309 (1938)".

For the present description, the expression "rare earth" is understood to mean the elements of the group consisting of yttrium and the elements of the periodic table with an atomic number inclusively between 57 and 71, cerium being excluded.

In addition, the calcinations for a given temperature and a given time correspond, unless otherwise indicated, to calcinations in air at a temperature hold over the period of time indicated.

The contents are given in weight of oxide unless otherwise indicated, the oxides of the rare earths being in the form of $Ln_2O_3$, Ln denoting the rare earth, with the exception of praseodymium expressed in the form of $Pr_6O_{11}$.

It is specified for the rest of the description that, unless otherwise indicated, in the ranges of values which are given, the values at the limits are included.

The compositions according to the invention are first of all characterized by the nature of their constituents.

These compositions are based on zirconium oxide and on at least one oxide of a rare earth which is different than cerium. The compositions of the invention specifically do not contain cerium oxide.

The compositions of the invention may thus be based on two or three oxides, that is to say in this case that the compositions contain oxides of two rare earths other than cerium or else, according to one preferred embodiment, based on four oxides, that is to say in this case that the compositions contain three other rare earths different than cerium.

The rare earths other than cerium can be more particularly selected from yttrium, lanthanum, neodymium, praseodymium or gadolinium.

Mention may more particularly be made of the compositions based on oxides of zirconium and yttrium, on oxides of zirconium and lanthanum and on oxides of zirconium and gadolinium, or else of the compositions based on oxides of zirconium, yttrium, neodymium and lanthanum, or else based on oxides of zirconium, yttrium, praseodymium and lanthanum, or also those based on oxides of zirconium, lanthanum and gadolinium, and on oxides of zirconium, yttrium and lanthanum.

The compositions of the invention may also comprise niobium oxide.

According to one particular embodiment, the compositions of the invention essentially consist of zirconium oxide and of at least one oxide of a rare earth other than cerium. The expression "essentially consists" is understood to mean that the composition in question contains only the oxides of the abovementioned elements and that it contains no oxide of another element, for example of cerium or of an element other than a rare earth, capable in particular of having a positive influence on the stability of the specific surface area of the composition. On the other hand, the composition may contain elements such as impurities that may in particular originate from its preparation process, for example from the raw materials or starting reagents used.

The zirconium oxide content is at least 50%, preferably at least 70%. Mention may thus be made of a zirconium content that will be between 50% and 90% and more particularly between 50% and 70%.

The content of oxides of all the rare earths other than cerium is generally at most 30%, more particularly at most 20% and at least 4%, preferably at least 5%, especially at least 10% and more particularly still at least 15%. It may in particular be between 10% and 30% and especially between 10% and 25%.

The niobium oxide content is preferably at most 10% and more particularly between 5% and 10%.

As was seen above, one of the main features of the compositions of the invention is their porosity.

Thus, the compositions of the invention exhibit two quite distinct pore populations which are centered about the values given above.

It is indicated here and for all of the description that the porosities indicated are measured by mercury intrusion porosimetry in accordance with standard ASTM D 4284-83 (Standard method for determining pore volume distribution of catalysts by mercury intrusion porosimetry).

The porosity measurement method given above makes it possible to establish, in a known manner, pore size plots which give the pore volume as a function of the pore size (V=f(d), V denoting the pore volume and d denoting the pore diameter). From this pore size plot, it is possible to obtain, still in a known manner, a curve (C) giving the derivative of V as a function of d. This curve may have peaks according to the diameter of the pores.

For the purpose of the invention, the expression "population of pores of which the diameters are centered about a given value" is understood to mean the presence, in the curve (C), of a peak, the maximum of which is located at this given value. It can be noted here that the peak may be in the form of a shoulder to a main peak. In addition, it should be noted that, when it is indicated that the compositions of the invention exhibit one or two pore populations this does not exclude that there may be other pore populations. In fact, the pores which are considered to be features of the invention are mesopores or even macropores, i.e. pores of which the diameter is at most 350 nm. In other words, the compositions of the invention have pores in a range of from approximately 1 nm to approximately 350 nm.

Thus, as indicated above, after calcination at a temperature of 900° C. for 4 hours, these compositions exhibit two pore populations. The first population corresponds to pores of which the diameters are centered about a value of between 20 nm and 40 nm, especially between 20 nm and 35 nm and more particularly between 20 and 30 nm and even more particularly around 25 nm. The second population corresponds to pores of which the diameters are centered about a value of between 80 nm and 200 nm, especially between 80 nm and 150 nm and more particularly between 80 nm and 130 nm. This value may also be between 90 nm and 150 nm and more particularly between 90 nm and 110 nm and even more particularly around 100 nm.

After calcination at higher temperatures, the porosity of the compositions of the invention changes. Thus, after calcination at 1000° C. for 4 hours, they exhibit a population of pores of which the diameter is centered about a value of between 30 nm and 40 nm and more particularly around 35 nm. At this temperature, the compositions of the invention exhibit pores in a range of from approximately 1 nm to approximately 300 nm.

Moreover, after calcination at 1100° C. for 4 hours, they exhibit a population of pores of which the diameter is centered about a value of between 30 nm and 70 nm, more particularly around 50 nm. At this temperature, the compositions of the invention exhibit pores in a range of from approximately 1 nm to approximately 300 nm.

The presence of a pore population centered about the values described above offers a good balance between the thermal stability of the specific surface area and the gas diffusion.

The compositions of the invention have, moreover, a total pore volume of at least 1.3 ml Hg/g, more particularly of at least 1.5 ml Hg/g, this pore volume being measured on compositions having undergone calcination at a temperature of 900° C. for 4 hours. This total pore volume can be in particular of at least 1.6 ml Hg/g, more particularly of at least 1.7 ml Hg/g and even more particularly of at least 1.8 ml Hg/g. Under these same calcination conditions, pore volumes of at least approximately 2.2 ml Hg/g or else of at least approximately 2.5 ml Hg/g can be obtained.

The total pore volume of the compositions measured after calcination at 1000° C. for 4 hours is of at least 1.2 ml Hg/g and of at least 0.9 ml Hg/g at 1100° C. for 4 hours. At 1000° C., pore volumes up to at least approximately 1.9 ml Hg/g or else at least approximately 2.2 ml Hg/g can be obtained, and, at 1100° C., up to at least approximately 1.3 ml Hg/g.

After calcination at 1000° C. for 4 hours the compositions of the invention, in the case in particular where these comprise lanthanum oxide, may be in the form of two different crystallographic phases of cubic nature.

These crystallographic structures are demonstrated by the X-ray diffraction patterns of the compositions of the invention. These same X-ray patterns make it possible to determine, by means of the Scherrer formula, a crystallite size measured on the most intense peaks of at most 8 nm.

The compositions of the invention have a high specific surface area owing in particular to their specific porosity.

Thus, after calcination at 1100° C. for 4 hours, they have a specific surface area of at least 25 $m^2/g$, more particularly of at least 27 $m^2/g$, in particular in the case where the content of rare earths other than cerium is higher. Under these same conditions it is possible to obtain surface area values of up to approximately 33 $m^2/g$ or else approximately 37 $m^2/g$, and for the latter value very particularly in the case where the content of oxide of all the rare earths other than cerium is of at least 15%.

After calcination at 1150° C. for 10 hours, they can have a specific surface area of at least 7 $m^2/g$, preferably of at least 10 $m^2/g$. Under these same conditions it is possible to obtain surface area values of up to approximately 18 $m^2/g$ or else approximately 20 $m^2/g$, and for the latter value very particularly in the case where the content of oxide of all the rare earths other than cerium is of at least 15%.

After calcination at 1200° C. for 10 hours, the compositions of the invention can have a specific surface area of at least 2 $m^2/g$, preferably of at least 4 $m^2/g$ and even more particularly of at least 6 $m^2/g$. Surface area values of up to approximately 12 $m^2/g$ can be obtained.

The processes for preparing the compositions of the invention will now be described. These processes may be carried out according to various embodiments.

According to a first embodiment, the process of the invention comprises the following steps:

(a1) a mixture is formed in the liquid phase comprising either a zirconium compound only or this compound with one or more compounds of rare earths other than cerium, in an amount of the latter compound(s) which is less than the amount required to obtain the desired composition;

(b1) said mixture is brought together with a basic compound, with stirring;

(c1) the medium obtained in the preceding step is brought together, with stirring, with either the compounds of rare earths other than cerium if these compounds were not present in step (a1), or the required remaining amount of said compounds, the stirring energy used during step (c1) being less than that used during step (b1), as a result of which a precipitate is obtained;

(d1) said precipitate is heated in an aqueous medium;

(e1) an additive selected from anionic surfactants, nonionic surfactants, polyethylene glycols, carboxylic acids and their salts and surfactants of the carboxymethylated fatty alcohol ethoxylate type is added to the precipitate obtained in the preceding step;

(f1) the resulting precipitate is calcined.

The first step (a1) of the process therefore consists in preparing a mixture of some of the compounds of the constituent elements of the composition that it is sought to prepare. The mixing is generally carried out in a liquid medium which is preferably water.

This step (a1) can be carried out according to two variants.

In the case of the first variant, which is a preferred variant, the mixture formed in step (a1) comprises, with regard to the constituent elements of the composition, i.e. the zirconium and rare earths, only the zirconium compound.

In the case of the second variant, the mixture formed in step (a1) comprises, in addition to the zirconium compound, one or more compounds of rare earths, but in an amount which is less than the required total stoichiometric amount of the compounds of rare earths for obtaining the desired composition. This amount may more particularly be at most equal to half the total amount.

It will be noted that this second variant should be understood to cover the case, for the compositions where, in step (a1), the required total amount of compound of at least one of the rare earths is present right from this step and where it is only for at least one of the other remaining rare earths that the amount of the compound of this other rare earth is less than the amount required. It is also possible for the compound of this other rare earth to be absent in this step (a1).

The compounds are preferably soluble compounds. They may in particular be zirconium salts and rare earth salts. These compounds may be selected from nitrates, sulfates, acetates and chlorides.

By way of examples, mention may thus be made of zirconium sulfate, zirconyl nitrate or zirconyl chloride.

The zirconyl sulfate may originate from placing crystalline zirconyl sulfate in solution. It may also have been obtained by dissolution of zirconium basic sulfate with sulfuric acid, or else by dissolution of zirconium hydroxide with sulfuric acid. In the same way, the zirconyl nitrate may originate from placing crystalline zirconyl nitrate in solution or else it may have been obtained by dissolution of zirconium basic carbonate or else by dissolution of zirconium hydroxide with nitric acid.

It is advantageous to use salts with a purity of at least 99.5% and more particularly of at least 99.9%.

It will be noted here that the solutions of zirconyl salts can have a certain initial free acidity which can be adjusted by adding a base or an acid. It is, however, just as possible to use an initial solution of zirconium salts actually having a certain free acidity as mentioned above, as it is to use solutions that have been neutralized beforehand to a lesser or greater extent. This neutralization can be carried out by adding a basic compound to the abovementioned mixture so as to limit this acidity. This basic compound may, for example, be a solution of aqueous ammonia or else of alkali metal (sodium, potassium, etc.) hydroxides, but preferably a solution of aqueous ammonia.

It may be advantageous to use a zirconium compound in the form of a combination or of a mixture of the abovementioned salts. Mention may, for example, be made of the combination of zirconium nitrate with zirconium sulfate, or else the combination of zirconium sulfate with zirconyl chloride. The respective proportions of the various salts can vary to a large extent, from 90/10 to 10/90 for example, these proportions denoting the contribution of each of the salts in grams of total zirconium oxide.

Finally, it is also possible to use a sol as starting zirconium compound. The term "sol" denotes any system consisting of fine solid particles of colloidal dimensions, i.e. dimensions of between approximately 1 nm and approximately 200 nm, based on a zirconium compound, this compound generally being a zirconium oxide and/or oxide hydrate, in suspension in an aqueous liquid phase.

The sols or colloidal dispersions used may be stabilized by the addition of stabilizing ions.

These colloidal dispersions may be obtained by any means known to a person skilled in the art. In particular, mention may be made of the partial dissolution of a zirconium precursor. The term "partial" is understood to mean that the amount of acid used in the reaction for attacking the precursor is less than the amount required for the complete dissolution of the precursor.

These colloidal dispersions may also be obtained by hydrothermal treatment of solutions of zirconium precursors. It does not matter whether the mixture is obtained from compounds initially in the solid state, which will subsequently be introduced into an aqueous stock for example, or else directly from solutions or suspensions of these compounds followed by mixing, in any order, of said solutions or suspensions.

In the second step (b1) of the process, said mixture is brought together with a basic compound in order to react them. Products of the hydroxide type can be used as base or basic compound. Mention may be made of alkali metal or alkaline-earth metal hydroxides. Use may also be made of secondary, tertiary or quaternary amines. However, amines and aqueous ammonia may be preferred since they reduce the risks of pollution by alkali metal or alkaline-earth metal cations. Mention may also be made of urea.

The basic compound may be more particularly used in the form of a solution. Finally, it may be used with a stoichiometric excess in order to ensure optimum precipitation.

This bringing together is carried out with stirring. It can be carried out in any way, for example by adding a preformed mixture of the compounds of the abovementioned elements to the basic compound in the form of a solution.

Prior to carrying out the next step of the process, it is possible to adjust the pH of the medium obtained at the end of the preceding step (b1) by adding acid to this suspension. Mention may be made of nitric acid, acetic acid, sulfuric acid or hydrochloric acid. Nitric acid is preferably used. When an adjustment of the pH is carried out, the final pH is between 5 and 10, preferably between 6 and 8.

The next step (c1) of the process consists in bringing the medium resulting from the preceding step (b1) together with the compounds of rare earths. In the case of the first variant mentioned above, in which the starting mixture formed in step (a1) comprises, as constituent elements of the composition, only the zirconium compound, these compounds are therefore introduced for the first time into the process and in the required total stoichiometric amount of these rare earths. In the case of the second variant, in which the mixture formed in step (a1) already comprises one or more compounds of rare earths, it is therefore a question of the required remaining amount of these compounds or, optionally, of the required amount of the compound of a rare earth if this compound was not present in step (a1).

This bringing together can be carried out in any way, for example by adding a preformed mixture of the compounds of rare earths to the mixture obtained at the end of step (b1). It is also carried out with stirring, but under conditions such that the stirring energy used during this step (c1) is less than that used during step (b1). More specifically, the energy used during step (c1) is at least 20% less than that of step (b1) and it may be more particularly less than 40% and even more particularly less than 50% thereof.

At the end of step (c1) the reaction medium is in the form of a solid or precipitate in suspension in a liquid phase.

The next step (d1) of the process is the step of heating this precipitate in this medium.

This heating can be carried out directly on the reaction medium obtained at the end of step (c1) or on a suspension obtained after separating the precipitate from the reaction medium, optionally washing, and putting the precipitate back into water. The temperature at which the medium is heated is at least 100° C. and even more particularly at least 130° C. It can be between, for example, 100° C. and 160° C. The heating operation can be carried out by introducing the liquid medium into a closed chamber (sealed reactor of the autoclave type). Under the temperature conditions given above, and in an aqueous medium, it can thus be specified, by way of illustration, that the pressure in the sealed reactor can range between an upper value at 1 bar ($10^5$ Pa) and 165 bar ($1.65 \times 10^7$ Pa), preferably between 5 bar ($5 \times 10^5$ Pa) and 165 bar ($1.65 \times 10^7$ Pa). The heating can also be carried out in an open reactor for temperatures of about 100° C.

The heating can be carried out either under air, or under an inert gas, preferably nitrogen, atmosphere.

The heating time can vary within broad limits, for example between 1 and 48 hours, preferably between 2 and 24 hours. Likewise, the increase in temperature is carried out at a rate which is not critical, and it is thus possible to reach the fixed reaction temperature by heating the medium for, for example, between 30 minutes and 4 hours, these values being given entirely by way of indication.

It is possible to carry out several heating operations. Thus, the precipitate obtained after the heating step and optionally washing can be resuspended in water and then a further heating of the resulting medium can be carried out. This further heating is carried out under the same conditions as those that were described for the first one.

The next step (e1) of the process consists in adding, to the precipitate resulting from the preceding step, an additive which is selected from anionic surfactants, nonionic surfactants, polyethylene glycols and carboxylic acids and their salts and also surfactants of the carboxymethylated fatty alcohol ethoxylate type.

With regard to this additive, reference may be made to the teaching of application WO-98/45212 and the surfactants described in this document may be used.

As surfactants of the anionic type, mention may be made of ethoxycarboxylates, ethoxylated fatty acids, sarcosinates, phosphate esters, sulfates such as alcohol sulfates, alcohol ether sulfates and sulfated alkanolamide ethoxylates, and sulfonates such as sulfosuccinates, and alkylbenzene or alkylnaphthalene sulfonates.

As nonionic surfactants, mention may be made of acetylenic surfactants, alcohol ethoxylates, alkanolamides, amine oxides, ethoxylated alkanolamides, long-chain ethoxylated amines, ethylene oxide/propylene oxide copolymers, sorbitan derivatives, ethylene glycol, propylene glycol, glycerol, polyglyceryl esters and ethoxylated derivatives thereof, alkylamines, alkylimidazolines, ethoxylated oils and alkylphenol ethoxylates. Mention may in particular be made of the products sold under the brands Igepal®, Dowanol®, Rhodamox® and Alkamide®.

With regard to the carboxylic acids, it is in particular possible to use aliphatic monocarboxylic or dicarboxylic acids and, among these, more particularly saturated acids. Fatty acids and more particularly saturated fatty acids may also be used. Mention may thus in particular be made of formic acid, acetic acid, propionic acid, butyric acid, isobutyric acid, valeric acid, caproic acid, caprylic acid, capric acid, lauric acid, myristic acid and palmitic acid. As dicarboxylic acids, mention may be made of oxalic acid, malonic acid, succinic acid, glutaric acid, adipic acid, pimelic acid, suberic acid, azelaic acid and sebacic acid.

Salts of the carboxylic acids may also be used, in particular the ammoniacal salts.

By way of example, mention may be made more particularly of lauric acid and ammonium laurate.

Finally, it is possible to use a surfactant which is selected from those of the carboxymethylated fatty alcohol ethoxylate type.

The expression "product of the carboxymethylated fatty alcohol ethoxylate type" is understood to mean products consisting of ethoxylated or propoxylated fatty alcohols comprising a $CH_2$—COOH group at the end of the chain.

These products may correspond to the formula:

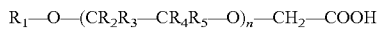

$$R_1-O-(CR_2R_3-CR_4R_5-O)_n-CH_2-COOH$$

in which $R_1$ denotes a saturated or unsaturated carbon-based chain of which the length is generally at most 22 carbon atoms, preferably at least 12 carbon atoms; $R_2$, $R_3$, $R_4$ and $R_5$ may be identical and may represent hydrogen or else $R_2$ may represent a $CH_3$ group and $R_3$, $R_4$ and $R_5$ represent hydrogen; n is a non-zero integer that may be up to 50 and more particularly between 5 and 15, these values being included. It will be noted that a surfactant may consist of a mixture of products of the formula above for which $R_1$ may be saturated or unsaturated, respectively, or alternatively products comprising both —$CH_2$—$CH_2$—O— and —C($CH_3$)—$CH_2$—O— groups.

The surfactant can be added in two ways. It can be added directly to the suspension of precipitate resulting from the preceding heating step (d1). It can also be added to the solid precipitate after separation thereof, by any known means, from the medium in which the heating took place.

The amount of surfactant used, expressed as percentage by weight of additive relative to the weight of the composition calculated as oxide, is generally between 5% and 100% and more particularly between 15% and 60%.

According to another advantageous variant of the invention, before implementing the final step of the process (calcination step), washing of the precipitate is carried out after having separated it from the medium in which it was in suspension. This washing can be carried out with water, preferably with water at basic pH, for example aqueous ammonia solution.

In a final step of the process, the precipitate recovered is subsequently calcined. This calcination makes it possible to develop the crystallinity of the product formed and it can also be adjusted and/or selected according to the subsequent operating temperature intended for the composition according to the invention, this being done while taking into account the fact that the specific surface area of the product decreases as the calcination temperature used increases. Such a calcination is generally carried out under air, but a calcination carried out, for example, under inert gas or under a controlled atmosphere (oxidizing or reducing) is very clearly not excluded.

In practice, the calcination temperature is generally limited to a range of values between 500° C. and 900° C. and more particularly between 700° C. and 800° C.

The duration of the calcination is not critical and depends on the temperature. Purely by way of indication, it can be at least 2 hours and more particularly at least 4 hours.

The invention also relates to another embodiment of the process which will be described below.

The process according to this second embodiment comprises the following steps:
- (a2) a zirconium compound is brought together, in the liquid phase, with a basic compound, as a result of which a precipitate is formed;
- (b2) said precipitate is heated in an aqueous medium;
- (c2) an additive selected from anionic surfactants, nonionic surfactants, polyethylene glycols, carboxylic acids and their salts and surfactants of the carboxymethylated fatty alcohol ethoxylate type is added to the precipitate obtained in the preceding step;
- (d2) the precipitate resulting from the preceding step is calcined at a temperature of at most 500° C.;
- (e2) a liquid-phase mixture comprising the product resulting from the preceding step and one or more compounds of rare earths other than cerium is formed;
- (f2) this mixture is brought together with a basic compound;
- (g2) the solid product resulting from the preceding step is heated in an aqueous medium;
- (h2) the product obtained at the end of the preceding step is calcined.

Step (a2) is similar to step (a1)) of the first embodiment described above, such that everything that has been described for step (a1), in particular with regard to the nature of the zirconium compounds, applies likewise here. In the same way as at the end of step (a1), a precipitate is obtained here. Step (b2) is, moreover, carried out under the same conditions as those given for step (d1) of the first embodiment. The same is also true for step (c2), i.e. the same types of additive as those described with regard to step (e1)) are used, and under the same conditions. At the end of the addition of the additive, washing of the precipitate can be carried out, as in the previous embodiment.

Finally, after separation of the solid product from the liquid medium obtained at the end of step (c2), calcination of this product is carried out under conditions similar to those described for step (f1), but in a temperature range which is generally lower. Thus, the calcination temperature in step (d2) is at most 500° C. It may be, for example, between 150° C. and 500° C. and more particularly between 200° C. and 300° C.

The process of the second embodiment comprises additional steps in which the compound(s) of rare earths other than cerium is (are) used. That which has been described with regard to these compounds for the first embodiment applies likewise here.

In a step (e2), a liquid-phase mixture comprising the product resulting from the preceding step (d2) and one or more compounds of rare earths other than cerium is formed. This mixture is subsequently brought together (step (f2)) with a basic compound of the same type as that described above, for example, for step (b1) and it is possible to use the basic compound with a stoichiometric excess.

At the end of step (f2), a liquid medium is obtained, containing a solid or precipitate in suspension which, in the next step (g2), is heated under the same conditions as those previously described for step (d1).

In a final step (h2), the solid or precipitate obtained at the end of the preceding step is recovered by any known means and is subjected to calcination. The conditions for this calcination can be identical to those described for step (f1).

The invention also relates to a third embodiment of the process, which comprises the following steps:
- (a3) either a zirconium compound only, or this compound with one or more compounds of rare earths other than cerium in an amount of the latter compound(s) which is less than the amount required to obtain the desired composition, is (are) brought together, in the liquid phase, with a basic compound, as a result of which a precipitate is formed;
- (b3) said precipitate is heated in an aqueous medium;
- (c3) the medium obtained in the preceding step is brought together with either one or more compounds of rare earths other than cerium, if these compounds were not present in step (a3), or the required remaining amount of said compounds;
- (d3) the medium obtained in the preceding step is brought together with a basic compound;
- (e3) an additive selected from anionic surfactants, nonionic surfactants, polyethylene glycols, carboxylic acids and their salts and surfactants of the carboxymethylated fatty alcohol ethoxylate type is added to the precipitate obtained in the preceding step;
- (f3) the resulting precipitate is calcined.

The process of this third embodiment is similar to that of the first embodiment, but it differs therefrom essentially in terms of the order of the steps. Therefore, what has been described above for step (a1)) combined with steps (b1), (d1) and (f1), applies to steps (a3), (b3), and (f3), respectively. In addition, the preceding description for the rare earth compounds, the additive of the surfactant type, the basic compound and more generally the conditions for implementing steps (c1), (b1) and (e1) applies likewise here for steps (c3), (d3) and (e3).

Variants can be envisioned for each of the three process embodiments described above, it being possible for these variants to allow the pore distribution to be controlled.

Thus, it is possible to adjust the ionic strength of the liquid-phase mixture of step (a1) or (a3) before it is brought together with the basic compound. It is also possible to form a solution of the zirconium compound prior to step (a2) and to adjust the ionic strength of this solution before bringing it together with the basic compound. This adjustment of the ionic strength is carried out by adding to said mixture or to said solution additional ions selected from sulfate, chloride and nitrate ions, for example by adding sulfuric acid or ammonium sulfate in a solution of zirconyl nitrate, of zirconyl chloride, or of a mixture of the two.

The basic compound of one of steps (b1), (a2) and (a3) can also be used in the form of a solution, the ionic strength of which is adjusted before the precipitation by addition to said solution of a salt selected from ammonium nitrate, ammonium sulfate or ammonium chloride.

The amount of ions added during this adjustment of the ionic strength can vary to a large extent. Expressed in number of moles of ions added per number of moles of zirconium ions present, it can range from 0.1 to 2.

The compositions of the invention as described above or as obtained by means of the preparation process previously described are in the form of powders, but they can optionally be formed so as to be in the form of granules, beads, cylinders or honeycombs of variable dimensions.

These compounds can be used with any material customarily employed in the field of catalyst formulation, i.e. in particular thermally inert materials. This material may be selected from alumina, titanium oxide, cerium oxide, zirconium oxide, silica, spinels, zeolites, silicates, crystalline silicoaluminum phosphates or crystalline aluminum phosphates.

The compositions may also be used in catalytic systems comprising a coating (wash coat) with catalytic properties and based on these compositions with a material of the type of those mentioned above, the coating being deposited on a substrate of for example the metallic monolith type, for example Fecralloy, or made of ceramic, for example of cordierite, of silicon carbide, of alumina titanate or of mullite.

This coating is obtained by mixing the composition with the material so as to form a suspension which can subsequently be deposited on the substrate.

These catalytic systems and more particularly the compositions of the invention can have a great many applications.

They are thus particularly suitable for, and therefore can be used in, the catalysis of various reactions such as, for example, dehydration, hydrosulfurization, hydrodenitrification, desulfurization, hydrodesulfurization, dehydrohalogenation, reforming, steam reforming, cracking, hydrocracking, hydrogenation, dehydrogenation, isomerization, dismutation, oxychlorination, dehydrocyclization, of hydrocarbons or other organic compounds, oxidation and/or reduction reactions, the Claus reaction, the treatment of exhaust gases from internal combustion engines, demetallization, methanation, the shift conversion, or the catalytic oxidation of the soot emitted by internal combustion engines, such as diesel engines or petrol engines operating under lean burn conditions.

Finally, the catalytic systems and the compositions of the invention can be used as $NO_x$ traps or to promote the reduction of $NO_x$ compounds, even in an oxidizing medium.

In the case of these uses in catalysis, the compositions of the invention are employed in combination with precious metals; they thus act as a support for these metals. The nature of these metals and the techniques for incorporating the latter into the support compositions are well known to those skilled in the art. For example, the metals may be platinum, rhodium, palladium or iridium, and they can in particular be incorporated into the compositions by impregnation.

Among the uses mentioned, the treatment of exhaust gases from internal combustion engines (motor vehicle post-combustion catalysis) constitutes a particularly advantageous application. For this treatment, the products of the invention may provide increased effectiveness at low temperatures.

Therefore, the invention also relates to a process for treating the exhaust gases from internal combustion engines which is characterized in that use is made, as catalyst, of a catalytic system as described above or a composition according to the invention and as previously described.

Examples will now be given.

In examples 1 to 4, use is made of salt solutions with the following characteristics:
zirconium nitrate $[ZrO_2]$=260 g/l and d=1.403;
lanthanum nitrate $[La_2O_3]$=451 g/l and d=1.687;
yttrium nitrate $[Y_2O_3]$=371 g/l and d=1.658;
neodymium nitrate $[Nd_2O_3]$=519 g/l and d=1.76.

EXAMPLE 1

This example relates to the preparation, according to the first embodiment of the process of the invention, of a composition based on zirconium oxide, lanthanum oxide, yttrium oxide and neodymium oxide in the following respective proportions as weight percentage of the oxides: 83.3%-2.2%-8.9%-5.6%.

Two solutions of nitrates are prepared beforehand, the first one consisting of zirconium nitrate and the second one consisting of lanthanum nitrate, yttrium nitrate and neodymium nitrate.

0.359 l of water is introduced into a first beaker with 0.307 l of zirconium nitrate solution. 95.5 ml of water, 4.7 ml of lanthanum nitrate solution, 23 ml of yttrium nitrate solution and 10.4 ml of neodymium nitrate solution are introduced into a second beaker.

A solution of aqueous ammonia (12 mol/l) is introduced into a reactor equipped with an inclined-blade stirring rotor and the volume is then made up with distilled water so as to obtain a total volume of 0.8 liter and a stoichiometric excess of aqueous ammonia of 40% relative to the cations to be precipitated.

The two solutions previously prepared are kept constantly stirring.

Firstly, the first nitrate solution is introduced, over the course of 60 minutes, into the reactor stirred at a speed of 500 rpm.

Secondly, the second solution of nitrates is introduced, over the course of 15 minutes, into the reactor and the stirring is fixed at 250 rpm.

The resulting precipitate suspension is placed in a stainless steel autoclave equipped with a stirring rotor. The temperature of the medium is brought to 150° C. for 2 hours with stirring.

33 grams of lauric acid are added to the resulting suspension. The suspension is kept stirring for 1 hour.

The suspension is then filtered over a Büchner funnel, and then washed with aqueous ammonia solution.

The product obtained is then brought to 700° C. for a hold of 4 hours.

COMPARATIVE EXAMPLE 2

This example relates to the preparation of a composition identical to that of example 1, but via a process from the prior art.

A solution of zirconium nitrate, lanthanum nitrate, yttrium nitrate and neodymium nitrate is prepared beforehand.

Introduced into the beaker with 0.307 l of zirconium nitrate solution are 4.7 ml of lanthanum nitrate solution, 23 ml of yttrium nitrate solution and 10.4 ml of neodymium nitrate solution and finally 455 ml of water.

A solution of aqueous ammonia (12 mol/l) is introduced into a reactor equipped with an inclined-blade stirring rotor and the volume is then made up with distilled water so as to obtain a total volume of 0.8 liter and a stoichiometric excess of aqueous ammonia of 40% relative to the cations to be precipitated.

The solution previously prepared is kept constantly stirring.

The solution of zirconium nitrate, lanthanum nitrate, yttrium nitrate and neodymium nitrate is introduced into the reactor stirred at a speed of 500 rpm.

The resulting precipitate suspension is placed in an autoclave and the process is then carried out (autoclaving, addition of lauric acid, washing and calcination) as in example 1.

Table 1 below gives, for the compositions of each of the previous examples, the specific surface areas after calcination for the times and at the temperatures indicated.

The calcinations at 900° C. and at the other temperatures up to 1200° C. were carried out on the products obtained at the end of the process described in the examples, i.e. products which have already undergone a first calcination at 700° C.

TABLE 1

| Specific surface area ($m^2/g$) Example | 4 h 700° C. | 4 h 900° C. | 4 h 1000° C. | 4 h 1100° C. | 10 h 1150° C. | 10 h 1200° C. |
|---|---|---|---|---|---|---|
| 1 | 75 | 64.6 | 48.3 | 27 | 11.8 | 2.6 |
| Comparative 2 | | 66.5 | 46.5 | 21.6 | 6.2 | 1.1 |

Table 2 below gives, for the compositions of each of the previous examples, the total pore volume and the pore size.

These porosity characteristics are those measured on compositions which were calcined at 900° C. for 4 hours after having been subjected to the first calcination at 700° C. during their preparation by the process described in the examples.

The porosity measurements were carried out using a Micromeritics Autopore 9420 porosimeter with a no. 08 penetrometer.

The contact angle between the sample and the mercury is fixed at 130°. The sample of around 200 mg were degassed in an oven for 2 hours at 200° C. before weighing and analysis.

The values which appear in the "pore size" column correspond to the diameters about which the pore populations are centered, the indication of a single value indicating the presence of a single population and the indication of two values indicating the presence of two populations.

FIG. 1 is obtained from a pore size plot of the product of example 1.

This FIGURE has a curve which is the derivative of the pore volume as a function of the pore diameter.

TABLE 2

| Example | Total pore volume (ml Hg/g) | Pore size (nm) |
|---|---|---|
| 1 | 1.7 | 25 and 120 |
| Comparative 2 | 1.3 | 25 |

Crystallographic Structure

After calcination at 1000° C. for 4 hours, the composition of example 1 exhibits two distinct crystallographic phases, at least one of which is cubic, and the composition of example 2 exhibits a single phase.

EXAMPLE 3

This example relates to the preparation of a composition identical to that of example 1, but according to the second embodiment of the process of the invention.

Introduced, with stirring, into a reactor containing water and a solution of aqueous ammonia (12 mol/l) in an amount corresponding to a stoichiometric excess of aqueous ammonia of 40% relative to the cations to be precipitated, are 0.359 l of the zirconium nitrate solution having the characteristics described above. The content of zirconium in the reactor, expressed as oxide, is 50 g/l.

A precipitate suspension is obtained which is placed in a stainless steel autoclave equipped with a stirring rotor.

The temperature of the medium is brought to 150° C. for 2 hours with stirring.

33 grams of lauric acid are added to the resulting suspension. The suspension is kept stirring for 1 hour.

The suspension is then filtered over a Büchner funnel, and then washed with aqueous ammonia solution.

The product obtained is then brought to 300° C. for a hold of 4 hours.

The resulting product is put back into suspension in a beaker containing 95.5 ml of water and 4.7 ml, 23 ml and 10.4 ml respectively of the solutions of lanthanum nitrate, yttrium nitrate and neodymium nitrate having the characteristics described above.

Aqueous ammonia in a stoichiometric excess of 40% relative to the cations to be precipitated is then introduced.

The resulting precipitate suspension is placed in a stainless steel autoclave equipped with a stirring rotor.

The temperature of the medium is brought to 150° C. for 2 hours with stirring.

The suspension is then filtered over a Büchner funnel, and then washed with aqueous ammonia solution.

The product obtained is then brought to 700° C. for a hold of 4 hours.

EXAMPLE 4

This example relates to the preparation of a composition identical to that of example 1, but according to the third embodiment of the process of the invention.

Introduced, with stirring, into a reactor containing water and a solution of aqueous ammonia (12 mol/l) in an amount corresponding to a stoichiometric excess of aqueous ammonia of 40% relative to the cations to be precipitated, are 0.359 l of the zirconium nitrate solution having the characteristics described above.

The content of zirconium in the reactor, expressed as oxide, is 50 g/l.

A precipitate suspension is obtained which is placed in a stainless steel autoclave equipped with a stirring rotor.

The temperature of the medium is brought to 150° C. for 2 hours with stirring.

Added to the resulting suspension are 95.5 ml of water and 4.7 ml, 23 ml and 10.4 ml respectively of the solutions of lanthanum nitrate, yttrium nitrate and neodymium nitrate having the characteristics described above.

Aqueous ammonia in a stoichiometric excess of 40% relative to the cations to be precipitated is then introduced.

33 grams of lauric acid are added to the resulting suspension. The suspension is kept stirring for 1 hour.

The suspension is then filtered over a Büchner funnel, and then washed with aqueous ammonia solution.

The product obtained is then brought to 700° C. for a hold of 4 hours.

The products of examples 3 and 4 exhibit, after calcinations at 900° C. for 4 hours, two pore populations.

EXAMPLE 5

This example describes a catalytic test for a catalyst prepared from a composition according to the invention.
a) Catalyst Preparation The catalyst containing 0.1% by weight of metallic rhodium element relative to the weight of the whole of the catalyst is prepared by wet impregnation of rhodium nitrate on the product of example 1 which was subjected to an additional heat treatment at 500° C. for 4 hours.

The impregnated product is then subjected to slow evaporation, drying and finally calcination for 4 hours at 500° C. in air.

The catalyst in powder form is then aged for 6 hours at 1100° C. in a redox mixture (alternating 5 minutes streams of 1.8% CO and 10% $H_2O$ on the one hand and then of 1.8% $O_2$ and 10% $H_2O$ on the other hand).

Aging is carried out in a quartz tubular reactor, passed through by the gas stream.
b) Test Conditions Flow rate of the gases: 30 l/h.

Weight of catalyst: 20 mg (particle size fraction 100-200 microns) diluted with 150 mg of SiC.

The composition of the gases is given in table 3 below.

TABLE 3

| Component | Lean mixture richness: 0.979 % by volume | Rich mixture richness: 1.024 % by volume |
|---|---|---|
| $CO_2$ | 14.00 | 14.00 |
| $H_2O$ | 10.00 | 10.00 |
| CO | 0.40 | 1.40 |
| $O_2$ | 0.80 | 0.40 |
| $C_3H_6$ | 0.0375 | 0.0375 |
| $C_3H_8$ | 0.0125 | 0.0125 |
| NO | 0.095 | 0.095 |
| $N_2$ | Balance to 100 | Balance to 100 |

The results of the catalytic test are given in table 4 below.

TABLE 4

| | Rich mixture | | | |
|---|---|---|---|---|
| | NO conversion temperature (° C.) | | $C_3H_6$ conversion temperature (° C.) | |
| | Comparative example 2 | Example 1 | Comparative example 2 | Example 1 |
| T 20%[1] | 345 | 333 | 350 | 350 |
| T 50%[2] | 360 | 339 | 360 | 352 |
| | Lean mixture | | | |
| | CO conversion temperature (° C.) | | $C_3H_6$ conversion temperature (° C.) | |
| | Comparative example 2 | Example 1 | Comparative example 2 | Example 1 |
| T 20% | 285 | 285 | 325 | 304 |
| T 50% | 310 | 300 | 420 | 410 |

[1]initiation temperature at 20% conversion for NO or CO
[2]half-conversion (50% conversion) temperature for NO or $C_3H_6$.

In a rich mixture, the initiation and half-conversion temperatures are either identical or lower for the catalyst according to the invention than for the catalyst obtained from a prior art product. The same is true for the initiation temperature in the lean mixture.

All of these results show the improved low-temperature effectiveness of the catalysts based on compositions of the invention.

In the following examples 6 and 7, use is made of salt solutions with the following characteristics:
zirconium nitrate [$ZrO_2$]=265 g/l and d=1.408;
lanthanum nitrate [$La_2O_3$]=454 g/l and d=1.687;
yttrium nitrate [$Y_2O_3$]=361 g/l and d=1.65;
neodymium nitrate [$Nd_2O_3$]=484 g/l and d=1.743.

EXAMPLE 6

This example relates to the preparation, according to the first embodiment of the process of the invention, of a composition based on zirconium oxide, lanthanum oxide, yttrium oxide and neodymium oxide in the following respective proportions as weight percentage of the oxides: 80%-4%-8%-8%.

Two solutions of nitrates are prepared beforehand, one consisting of zirconium nitrate and the other of lanthanum nitrate, yttrium nitrate and neodymium nitrate.

373 ml of water is introduced into a first beaker with 266 ml of zirconium nitrate solution. 82 ml of water, 8.2 ml of lanthanum nitrate solution, 29.4 ml of yttrium nitrate solution and 15.9 ml of neodymium nitrate solution are introduced into a second beaker.

A solution of aqueous ammonia (12 mol/l) is introduced with stirring into a reactor equipped with an inclined-blade stirring rotor and the volume is then made up with distilled water so as to obtain a total volume of 0.8 liter and a stoichiometric excess of aqueous ammonia of 40% relative to the cations to be precipitated.

The two solutions previously prepared are kept constantly stirring. The first nitrate solution is introduced, over the course of 45 minutes, into the reactor stirred at a speed of 500 rpm, the second solution of nitrates is then introduced over the course of 15 minutes and the stirring is fixed at 150 rpm.

The resulting precipitate suspension is placed in a stainless steel autoclave equipped with a stirring rotor. The temperature of the medium is brought to 150° C. for 2 hours with stirring.

33 grams of lauric acid are added to the resulting suspension. The suspension is kept stirring for 1 hour.

The suspension is then filtered over a Büchner funnel, and then washed with aqueous ammonia solution.

The product obtained is then calcined at 700° C. for a hold of 4 hours.

EXAMPLE 7

This example relates to the preparation, according to the first embodiment of the process of the invention, of a composition based on zirconium oxide, lanthanum oxide and yttrium oxide in the following respective proportions as weight percentage of the oxides: 85%-5%-10%.

Two solutions of nitrates are prepared beforehand, one consisting of zirconium nitrate and the other of lanthanum nitrate and yttrium nitrate.

396 ml of water is introduced into a first beaker with 283 ml of zirconium nitrate solution. 82 ml of water, 10.2 ml of lanthanum nitrate solution and 36.8 ml of yttrium nitrate solution are introduced into a second beaker.

A solution of aqueous ammonia (12 mol/l) is introduced with stirring into a reactor equipped with an inclined-blade stirring rotor and the volume is then made up with distilled water so as to obtain a total volume of 0.8 liter and a stoichiometric excess of aqueous ammonia of 40% relative to the cations to be precipitated.

The two solutions previously prepared are kept constantly stirring. The first nitrate solution is introduced, over the course of 45 minutes, into the reactor stirred at a speed of 500 rpm, the second solution of nitrates is then introduced over the course of 15 minutes and the stirring is fixed at 150 rpm.

The resulting precipitate suspension is placed in a stainless steel autoclave equipped with a stirring rotor. The temperature of the medium is brought to 150° C. for 2 hours with stirring.

33 grams of lauric acid are added to the resulting suspension. The suspension is kept stirring for 1 hour.

The suspension is then filtered over a Büchner funnel, and then washed with aqueous ammonia solution.

The product obtained is then calcined at 700° C. for a hold of 4 hours.

Table 5 below gives, for the compositions of each of examples 6 and 7, the specific surface areas after calcination for the times and at the temperatures indicated.

The calcinations at 900° C. and at the other temperatures up to 1200° C. were carried out on the products obtained at the end of the process described in the examples, i.e. products which have already undergone a first calcination at 700° C.

TABLE 5

| Specific surface area ($m^2/g$) Example | 4 h 900° C. | 4 h 1000° C. | 4 h 1100° C. | 10 h 1150° C. | 10 h 1200° C. |
|---|---|---|---|---|---|
| 6 | 65 | 50 | 33 | 15 | 5 |
| 7 | 58 | 50 | 26 | 13 | 4 |

Table 6 below gives, for the compositions of each of examples 6 and 7, the total pore volume measured on compositions which were calcined at 900° C. for 4 hours after having been subjected to the first calcination at 700° C. during their preparation by the process described in the examples. The porosity measurement was carried out with the same equipment and under the same conditions as those given for the products of examples 1 and 2.

TABLE 6

| Example | Total pore volume (ml Hg/g) |
|---|---|
| 6 | 1.9 |
| 7 | 1.7 |

The invention claimed is:

1. A composition comprising zirconium oxide and at least one oxide of a rare earth other than cerium, in a weight proportion of zirconium oxide of at least 50%, wherein after calcination at a temperature of 900° C. for 4 hours, the composition as measured by mercury intrusion porosimetry in accordance with standard ASTM D 4284-8 exhibits two populations of pores of which respective diameters are centered, for a first population, about a value of between 20 nm and 40 nm and, for a second population, about a value of between 80 nm and 200 nm, and wherein the composition has a specific surface area of at least 25 $m^2/g$ after calcination at 1100° C. for 4 hours.

2. The composition as defined by claim 1, wherein the diameter of the first population of pores is centered about a value of between 20 nm and 35 nm and the diameter of the second population of pores is centered about a value of between 80 nm and 150 nm.

3. The composition as defined by claim 1, wherein after calcination at a temperature of 900° C. for 4 hours, the composition has a total pore volume of at least 1.3 ml Hg/g.

4. The composition as defined by claim 1, wherein after calcination at 1100° C. for 4 hours, the composition exhibits a population of pores of which the diameter is centered about a value of between 30 nm and 70 nm.

5. The composition as defined by claim 1, wherein after calcination at 1100° C. for 4 hours, the composition has a total pore volume of at least 0.9 ml Hg/g.

6. The composition as defined by claim 1, wherein the composition is based on oxides of at least two rare earths other than cerium.

7. The composition as defined by claim 1, wherein the composition has a content of oxide of rare earth other than cerium of between 10% and 30%.

8. The composition as defined by claim 1, wherein the rare earth(s) other than cerium is (are) selected from the group consisting of a yttrium, a lanthanum, a neodymium, a praseodymium and a gadolinium.

9. The composition as defined by claim 1, wherein the composition comprises lanthanum oxide and wherein, after calcination at 1000° C. for 4 hours, the composition is in the form of two cubic crystallographic phases.

10. The composition as defined by claim 1, wherein the composition also comprises niobium oxide.

11. The composition as defined by claim 1, wherein after calcination at 1150° C. for 4 hours, the composition has a specific surface area of at least 7 $m^2/g$.

12. The composition as defined by claim 2, wherein the diameter of the first population of pores is centered about a value of between 20 nm and 30 nm.

13. The composition as defined by claim 2, wherein the diameter of the second population of pores is centered about a value of between 90 nm and 110 nm.

14. The composition as defined by claim 3, wherein the total pore value is at least 1.5 ml Hg/g.

15. The composition as defined by claim 11, wherein the composition has a specific surface area of at least 10 $m^2/g$.

16. The composition as defined by claim 1, wherein the composition comprises:
 oxides of zirconium and yttrium, or
 oxides of zirconium and lanthanum, or
 oxides of zirconium and gadolinium, or
 oxides of zirconium, yttrium, neodymium and lanthanum, or
 oxides of zirconium, yttrium, praseodymium and lanthanum, or
 oxides of zirconium, lanthanum and gadolinium, or
 oxides of zirconium, yttrium and lanthanum.

17. A catalytic system wherein the system comprises a composition as defined by claim 1.

18. A process for treating exhaust gases from an internal combustion engine, the method comprising treating the exhaust gases with the catalytic system as defined by claim 17.

* * * * *